United States Patent [19]

Bailey et al.

[11] Patent Number: 4,722,615
[45] Date of Patent: Feb. 2, 1988

[54] DRILLING APPARATUS AND CUTTER THEREFOR

[75] Inventors: Thomas F. Bailey; John Campbell, both of Houston, Tex.

[73] Assignee: A-Z International Tool Company, Houston, Tex.

[21] Appl. No.: 851,828

[22] Filed: Apr. 14, 1986

[51] Int. Cl.[4] .................... E21B 10/32; E21B 10/22; F16C 17/10; F16J 9/08

[52] U.S. Cl. ........................................ 384/96; 384/94; 384/95; 175/369; 175/371; 277/95; 277/206 R

[58] Field of Search ..................................... 384/92–96, 384/147, 148, 477, 484, 489, 151-153; 175/369–371; 277/95, 205, 206 R

[56] References Cited

U.S. PATENT DOCUMENTS

| | | | |
|---|---|---|---|
| 1,835,523 | 12/1931 | Reed | 175/369 |
| 2,104,819 | 1/1938 | Schlumpf et al. | 384/92 |
| 2,190,365 | 2/1940 | Maxwell | 384/92 |
| 2,641,447 | 6/1953 | Kammerer | 175/370 X |
| 3,047,344 | 7/1962 | Gros | 384/93 |
| 4,161,343 | 7/1979 | Brashear | 384/96 |
| 4,181,377 | 1/1980 | Oelke | 384/96 |
| 4,235,295 | 11/1980 | Zyglewyz | 175/371 |
| 4,266,622 | 5/1981 | Vezirian | 175/366 |
| 4,293,167 | 10/1981 | Mayo et al. | 384/92 |
| 4,413,918 | 11/1983 | Thomas | 384/95 |
| 4,444,518 | 4/1984 | Schramm et al. | 384/96 |
| 4,478,299 | 10/1984 | Dorosz | 175/369 |
| 4,533,003 | 8/1985 | Bailey et al. | 175/269 |
| 4,600,064 | 7/1986 | Scales et al. | 175/368 |

FOREIGN PATENT DOCUMENTS

975124 11/1964 United Kingdom ................ 384/95

Primary Examiner—Stuart S. Levy
Assistant Examiner—David Werner
Attorney, Agent, or Firm—Edgar A. Zarins; Malcolm L. Sutherland; Steven L. Permut

[57] ABSTRACT

An underreamer including a body having a bore therethrough, an arm mounted at its upper end to the body, a conical cutter mounted for rotation on the lower end of each arm, a cup-shaped thrust bearing between the cutter and the arm, means extending through the arm to secure the cutter on the arm including pin elements that extend into a groove in the cutter to prevent rotation movement between the arm and the thrust bearing to lock the thrust bearing to the arm. The arms are pivotally mounted in slots in the body and means are provided for moving the arms to their cutting position with their lower ends positioned radially outward from the body.

16 Claims, 15 Drawing Figures

DRILLING APPARATUS AND CUTTER THEREFOR

BACKGROUND OF THE INVENTION

I. Field of the Invention

This invention relates to underreamers and expansible cutters and, in particular, to an underreamer drill bit with a conical cutter having an improved cutter mounting.

II. Description of the Prior Art

Underreamers, expansible cutters and hole openers have been used for enlarging well bores either connected to a drill string above the drill bit or in the string without any drill bit on the lower end of the string. U.S. Pat. No. 3,386,521 is an example of the combined drill bit and underreamer and U.S. Pat. No. 3,171,503 is an example of an underreamer on the lower end of the drill string. U.S. Pat. No. 4,533,003 illustrates an improved means for securing a cutter to an underreamer arm.

Conical cutters have been used in drill bits and underreamers. Such conical cutters have been installed on a pin which extends downwardly and inwardly from the lower end of the underreamer arms. Roller bearings and balls have been used in mounting the conical cutters on the arms as shown in U.S. Pat. No. 2,641,447. Pins or balls locked in a groove between the arm and the interior of the conical cutter have been used to secure the cutters on their pins as shown in U.S. Pat. Nos. 2,661,447; 3,998,500; and 2,519,716. U.S. Pat. No. 4,161,343 discloses the use of a friction bearing and a thrust button between the pins and the cutters. U.S. Pat. No. 3,998,500 suggests the use of a bolt to secure a bearing sleeve on the pin. U.S. Pat. No. 4,478,299 shows a variety of bearings on the pin including a split bushing arrangement.

The amount of cutting that can be obtained from a conical cutter on an underreamer has been limited by the time in cutting service during which the cutter rotates relatively freely and this is a function of the efficiency of its mounting.

SUMMARY OF THE PRESENT INVENTION

The present invention relates to an improved underreamer, hole opener, or expansible rotary drill bit with a conical cutter having an improved cutter mounting. The underreamer includes a body with a bore therethrough, an arm pivotally mounted to said body at its upper end with a pin on its lower end, a conical cutter having a central bore, means for securing the pin in the central bore of the cutter, and bearing means positioned between the exterior and end of said pin and the wall of said central bore of the cutter. The bearing means is designed to take both the normal thrust and radial loads applied on the cutter during drilling and also a reverse thrust load which is placed on the cutter in an underreamer.

In the conventional conical cutter, i.e. cone bit, the cone is designed to roll around a circle as the cone bit turns. The radius of this circle is referred to as the natural rolling radius of the cone. As long as this rolling radius remains constant, wear on the cutter and its mounting assembly is relatively even and the cone bit will experience a good drilling life. However, when a cone bit is used in an underreamer, as the underreamer arms expand outwards in operation, the rolling radius is increased beyond the cone's normal rolling radius. The normal thrust load in a cone bit is directed head on against the cutter element. However, as the arms of the underreamer open, essentially all the loading on the cutter assembly is a reverse thrust load applied against the side of the cutter element. This reverse thrust load is the major element of the loading on the cutter assembly in an underreamer, particularly at the beginning of operation or if the underreamer only cuts a small shelf, because the underreamer only uses the outer rear edge of the cutter cone. Further, in a highly deviated hole, the reverse thrust load is predominate. As the cutter assembly opens during operation, the reverse thrust load reduces, but remains a significant element of the loading on the cutter assembly. Additionally, during operation the cone bit always tries to return to its natural rolling radius; i.e. to close the underreamer or track-in which creates its own load against the cutter assembly. These varying loads placed upon the cutter assembly during operation cause excessive wearing and uneven wearing of the cutter mounting assembly. One effect of such uneven wearing and excessive wearing is rapid deterioration of the pin on the underreamer arm and the bearings which form a part of the cutter assembly. In practice, when wear of the pin on the underreamer arm occurs, the end portion of the underreamer arm is cut off and a new portion is welded on. The heat of such welding weakens the underreamer arm. Additionally, each time the arm is cut to weld on a new end portion, more of the original arm must be removed to replace the heat weakened section. Accordingly, the cutter assembly can be replaced only a few times.

The underreamer cutter assembly of the present invention is designed to overcome these disadvantages in the existing underreamer arm and cutter assemblies. The underreamer arm of the present invention is a one-piece element having no welded connections. Furthermore, there is essentially no wear on the underreamer arm or its pin element by the cutter assembly during operation so that it does not need to be frequently replaced. Furthermore, the cutter element is attached to the pin element on the underreamer arm by a construction which provides a high capacity load bearing surface not only for the normal thrust load, but also for the reverse thrust load, as well as a large surface area to carry the radial load applied on the cutter during drilling.

To accomplish the above objectives, the bearing means of the present invention used to connect the cutter element to the pin element of the underreamer arm connects it, so that the bearing means is stationary on the pin element of the underreamer arm and all movement occurs between the bearing means and the cutter element. This assembly prevents wear on the pin element of the underreamer arm.

These and other objectives of the present invention, more specifically, are obtained in the embodiments of the present invention by utilizing a journal bearing which includes means for preventing rotation of the bearing element with respect to the pin on the underreamer arm. It is preferred to use a split journal bearing which further includes integral lobe means for carrying a reverse thrust load. Ball bearings do not have a heavy thrust capability; therefore, journal bearings are preferable. Furthermore, the two parts of the split journal bearing in the present invention are separated to provide additional advantages. In drilling operations, under load bearing conditions, the cutter assembly becomes hot and expands. With a one piece journal bearing or a split bearing wherein the two parts abut, this expansion upon heating can lock the bit and prevent lubrication. In the present invention, the journal bearing parts cannot lock up since they are separated and there is room for expansion. Furthermore, upon continued use of the cutter assembly and as wear occurs on the interior surfaces, grit and metal shavings are produced. Separation of the two halves of the split journal bearing provides an open area where such material can collect. In the conventional cutter assemblies, such grit and shavings rapidly cause additional wear internally of the assembly and eventual lockup of the cutter assembly.

BRIEF DESCRIPTION OF THE DRAWING

These and other objects and advantages are hereinafter set forth and explained with reference to the drawings wherein:

FIG. 5 is a partial bottom view of the embodiment of FIG. 3 taken in the direction of arrow a.

FIG. 6 is a side view of the thrust bearing of the embodiment of FIG. 3.

FIG. 7 is a top plan view illustrating the locking pin of the embodiment of FIG. 3.

DETAILED DESCRIPTION OF A PREFERRED EMBODIMENT OF THE PRESENT INVENTION

Figures 1, 2:
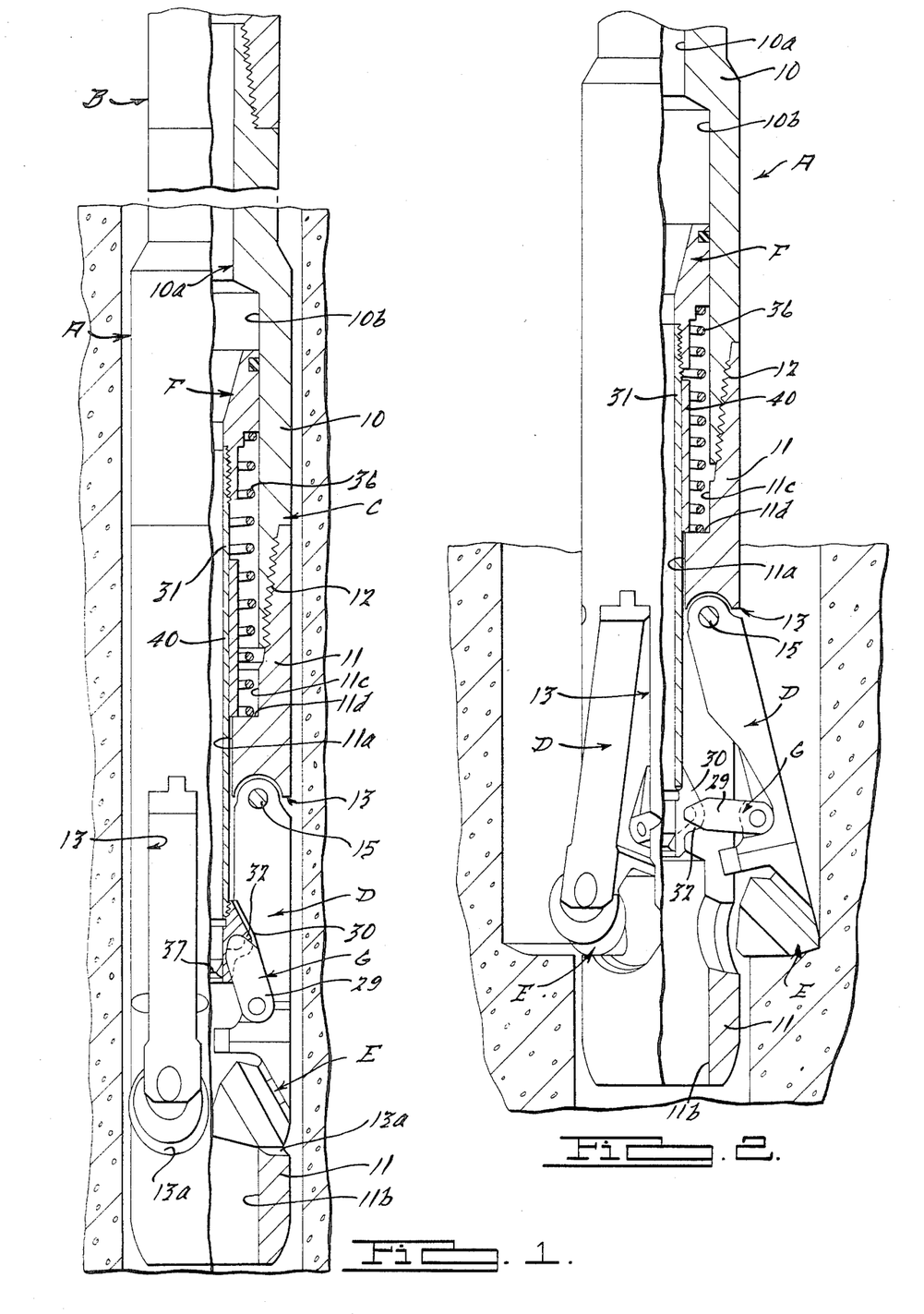
FIG. 1 is a view partly in section and partly in elevation showing the improved underreamer of the present invention in retracted or running position.
FIG. 2 is a similar view showing the underreamer in extended or cutting position.

In the drawings, the letter A designates the expansible rotary drill bit or underreamer tool comprising the present invention and the upper end of said tool is adapted to be secured to the lower end of a string of drill pipe B extending to the top of a well bore, by means of which said tool is ordinarily lowered through a string of well casing (not shown) to an area below said casing where the hole enlarging operation is to be carried out. In general, the tool comprises main body portion C within which are provided cutter carrying elements or connecting arms D having cutter assemblies E at their lower ends. Actuating piston F is movable within the bore of main body portion C and has connection with links G which connect said piston to cutter carrying elements or arms D. When piston F is moved downwardly, the lower ends of links G are swung outwardly and being connected to the lower portions of cutter carrying arms D, said arms are swung outwardly to move cutter assemblies E outwardly into their expanded cutting position as shown in FIG. 2. In such position, a rotation of the drill string rotates main body portion C and the cutter carrying elements, whereby cutter assemblies E will enlarge or drill out the well bore. When the piston returns to its upper position as shown in FIG. 1, links G connected therewith function to retract the cutters.

Body portion C comprises upper tubular section 10 having its upper end connected to drill pipe B and lower housing 11 which is connected to the upper section by threads 12. Upper section 10 has bore 10a which communicates with the bore, the drill pipe and counter bore 10b within which piston F is slidable. Housing 11 has axial bore 11a extending entirely therethrough and lower end 11b of said bore is enlarged as clearly illustrated in FIGS. 1 and 2.

A plurality of vertically extending slots 13 are formed within the body for the reception of the cutter carrying elements or arms D and as shown, three such slots are provided, although the number may vary. Each slot 13 extends longitudinally of housing 11, and openings for the reception of the ends of pivot pin 15, which pivots a cutter carrying element with a slot, are drilled in the side walls of each slot. The lower end of each slot terminates in circular opening 13a through which cutter assembly E, mounted on the lower end of each cutter carrying arm D, may move.

The construction of each cutter carrying element or arm D is substantially rectangular in cross-section, being provided with ears at its upper end having transverse opening therein. The width of each arm is substantially the same as the width of slot 13 and when arm D is in position within the slot, pivot pin 15 extends through the opening with its ends engaged in openings in housing 11, whereby each arm is pivotally mounted within each slot.

By reason of pivot pin 15 at the upper end of each arm, the arms may be swung outwardly beyond the confines of the outer surface of housing 11 so that cutter assemblies E will be expanded as shown in FIG. 2.

For effecting a simultaneous expansion of cutter arms D, each cutter arm has connection through a pair of links 29 with connecting element 30, which element is directly connected through tubular sleeve 31 with the lower end of annular piston F. Connecting element 30 has a plurality of outwardly projecting lugs, each having an opening or recess therein. The upper ends of links 29 are disposed one on each side of one of lugs 32 and each has an inwardly projecting lug which engages within the opening or recesses of lug on element 30 to pivotally connect the upper ends of said links to said lug. Lugs 29 are disposed one on each side of the boss which is formed in the inner face of each arm D and openings in the lower ends of links align with the opening in the boss to receive a pivot pin.

When the annular piston F is in its raised position to which it is urged by a coil spring 36, the connecting element 30 is also raised to be in close proximity to the inclined surface on the interior of each cutter arm D. By reason of the connection with the links 29, the links are swung to the position shown in FIG. 1 which causes their lower ends to move inwardly and maintain each arm retracted within the housing. An orifice ring 37 is mounted within the lower portion of the bore of the connecting element 30 (FIG. 1) and when pressure fluid is pumped downwardly through the drill stem and through the annular piston F as well as the connecting sleeve 31, the orifice ring creates a restriction which will cause a pressure buildup above piston F. When this increased pressure overcomes the force of the coil spring 36, the piston F, sleeve 31 and connecting element 30 move downwardly with respect to the housing and to the cutter arms. This moves the upper pivot point between the connecting links and element 30 downwardly which results in an outward swinging movement of the lower ends of the line 29; such outward swinging movement causes the cutter arms D to pivot about the upper pin 15 whereby the lower ends of the arms are swung outwardly to move the cutters E to an expanded position. In order to control the radial expansion of the cutter arms, the downward movement of the annular piston F is limited by a stop sleeve 40 which surrounds the connecting sleeve 31 and rests upon an annular shoulder 11d formed between the bore 11a and the counter bore 11c of the housing 11. When the lower end of the piston engages the upper end of the stop sleeve 40, further downward movement of the piston is prevented to thereby limit the extent to which the lower end of links 29 are swung.

Figure 3:
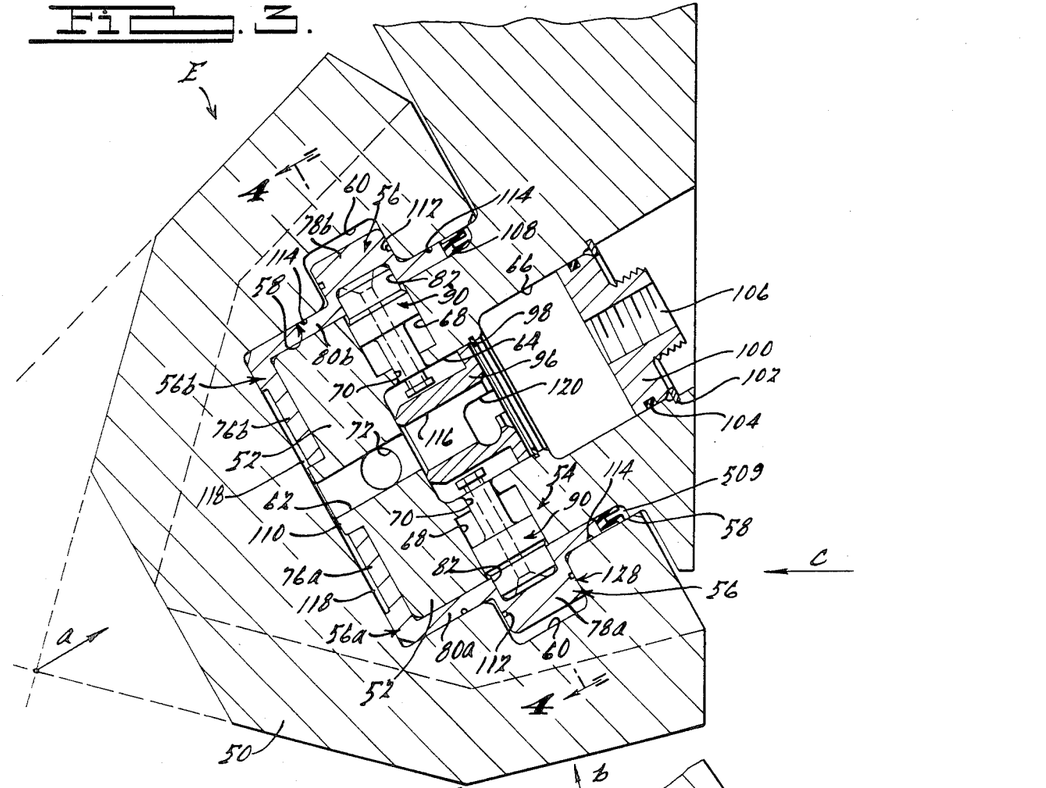
FIG. 3 is a detailed sectional view of the pin on the lower end of the underreamer arm and the mounting of the conical cutter thereon.
Figure 4:
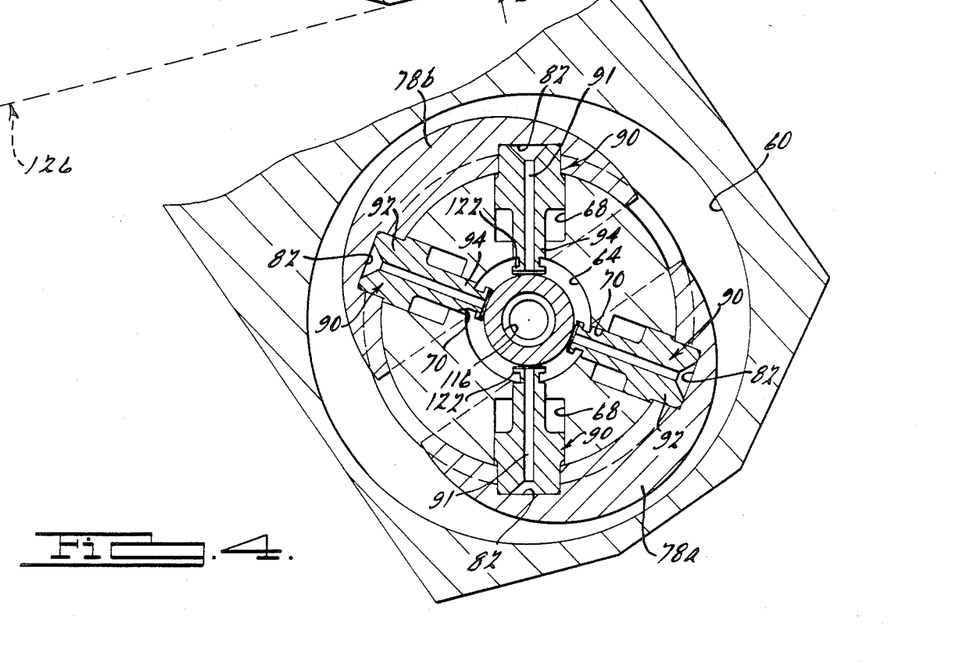
FIG. 4 is a cross-sectional view of the embodiment of FIG. 3 taken along section line 4—4.

As shown in FIG. 3, cutter assembly E includes conical cutter 50 having suitable formation engaging elements (not shown), such as teeth or inserts, means 54 to secure cutter 50 on pin 52 of arm D and thrust bearing means 56 interposed between the interior of cutter 50 and the exterior of pin 52 to insure freedom of rotation of cutter 50 during cutting.

Cutter 50 is suitably shaped on its exterior as is well known in the art of conical cutters and has an internal bore 58 with a circular groove 60 cut in the side walls. Pin 52 extends downwardly and inwardly from the lower end of arm D and has a central bore 64 and counter bore 66. A hole 62 extends from the bottom of bore 64 to the end of pin 52. Pin 52 has, in the embodiment of FIG. 3, four bores 68 drilled at right angles to the central bore 64 which are connected by counter bores 70 to central bore 64. Further, a hole 72 is drilled at right angles to hole 62 completely through the end of pin 52.

Thrust bearing means 56, of suitable material as is well known, is a split bearing having two halves 56a and 56b which when placed together have an annular cup shape. Each half of thrust bearing 56 includes a bottom element 76a and 76b respectively, a side wall 80a and 80b respectively and a lobe extending outwardly from the side walls 78a and 78b, respectively. Holes 82 are drilled into the side walls 80, one hole 82 for each bore 68. The bottom elements 76a and 76b are separated by a machined rib 110 on pin 52. A number of grease grooves are provided in the surfaces of the thrust bearing including grooves 109 in bottom elements 76a and 76b, grooves 112 in the upper and lower surfaces of lobes 78a and 78b, and grooves 114 in the side walls 80a and 80b. Further, the bottom surfaces of bottom elements 76a and 76b are machined at 118 to provide an initial space for grease at the beginning of operation.

Figures 5, 6, 7:
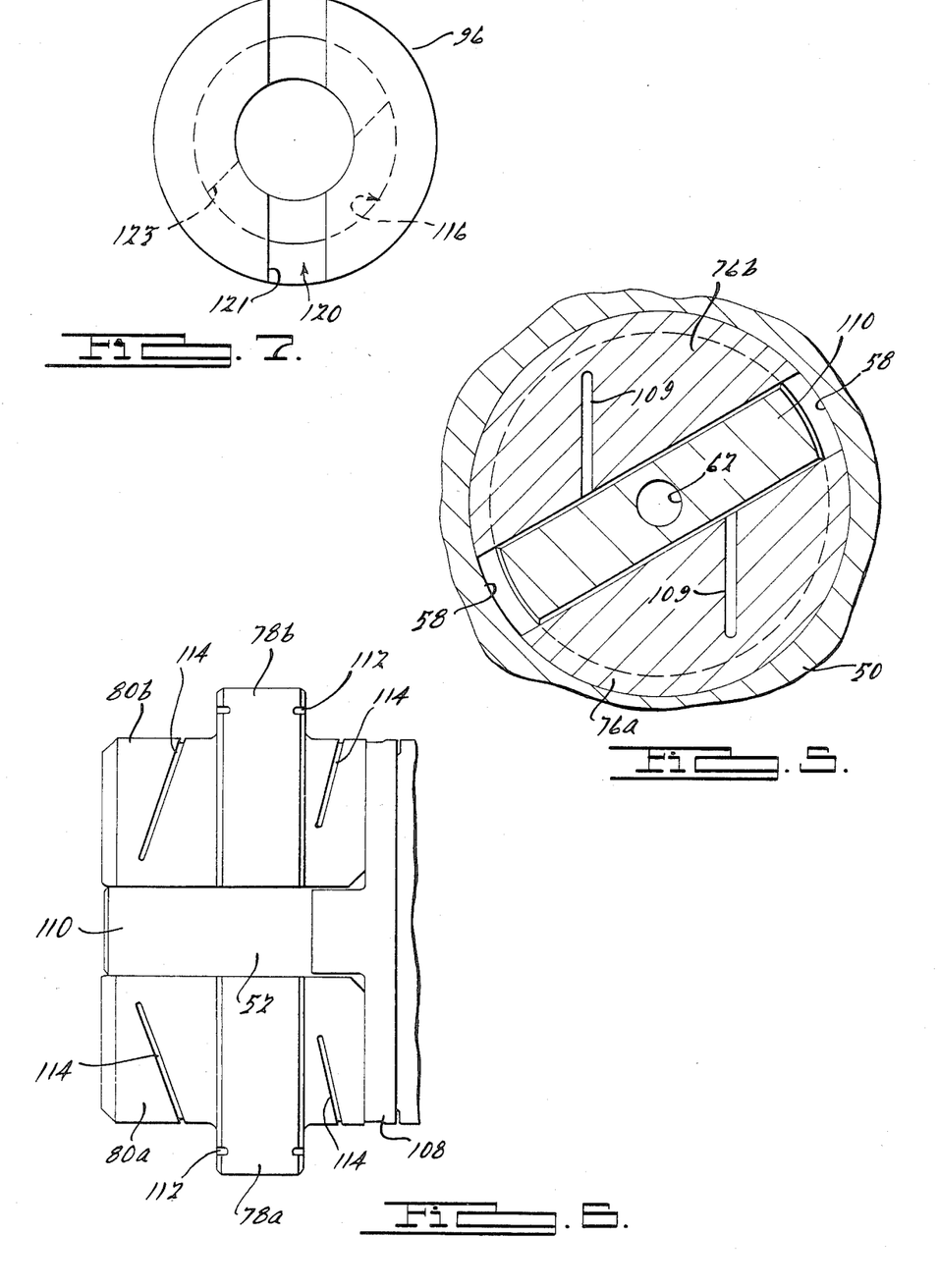

Pins 90 are provided to hold the thrust bearing 56a, 56b stationary with respect to pin 52 during operation of the cutter. Each pin 90 includes a main body element 92 having a forward machined surface which fits into bore 82 in a respective thrust bearing lobe, a rearward section which slides within bore 68 and a rearward extending pin element 94 which extends through hole 70 in pin 52 to the interior counter bore 64. A key element 96, upon assembly of the thrust bearing keeps the pins 92 extended into bores 82 to lock the thrust bearing in place. Key element 96 slides within counter bore 64 and has a lower end that is machined to position the pins 90 outwardly upon insertion of key element 96 into counterbore 64. Preferably, pins 90 have a bore 91 therethrough to prevent a vacuum from forming which would prevent removal of the pins. A snap ring 98 retains key element 96 within counter bore 64 after assembly of the pins. Central bore 116 in element 96 connects bore 64 on the bore 62 to form a grease chamber. Counter bore 66 which extends to the outer surface of arm D is sealed by plug 100 which is retained in place by snap ring 102. An "O" ring 104 is provided to seal counter bore 66 with respect to the exterior of the arm. A central plug 106 is threaded into plug 100 to permit access to the interior of counter bore 66 and counter bore 64. A seal 108 is also provided in order to reduce wear on the pin 52 while enclosing the cutter bore as will be subsequently described.

To assemble the cutter assembly E, pins 90 are placed in bores 68 in their retracted position with pin elements 94 extending rearwardly into central bore 64. Seal 108 is placed on pin 52. Thrust bearing elements 56a, 56b are placed inside cutter 50 with lobes 78a, 78b inside groove 60. The cutter with the thrust bearing elements in place is placed on pin 52 with the two elements separated by rib 110. Thereafter, pins 90 are pushed outwardly into bores 82 and key element 96 is inserted to hold pins 90 in their outward position. If desired, key element 96 may have a tapered end and be used to force elements 96 into their outward position. Snap ring 98 is put in place to hold key element 96 in place and the cutter is assembled. The "O" ring is placed upon plug 100 which is pushed into counter bore 66 and the upper snap ring 102 is put in place.

Placement of plug 100 creates with central bore 64 and counter bore 66 a grease chamber for lubrication of the cutter assembly E. This chamber provides lubrication to thrust bearing elements 56a, 56b through holes 62 and 72 and central bore 116 in key element 96. Grease slots 109, 112, 114, 118 provided in the bottom and side walls of the thrust bearing elements 56a and 56b permit movement of grease to the various load bearing surfaces.

After assembly of the cutter assembly E as described above, a vacuum is pulled in the grease chamber formed by central bore 64 and counter bore 66 and the grease chamber is loaded with grease under pressure. The pressure of the grease pushes plug 100 which operates as a piston, against upper snap ring 102. Counter bore 66 is open to the well pressure which will act against plug 100 to keep pressure on the grease during operation of the cutter assembly. The pressure in the chamber will fill the central cavity of cutter element 50 via grease slots 109, 112, 114, 118 and the play between the various elements of the mounting assembly so that the outer surface of thrust bearing elements 56a, 56b and slot 60 are lubricated during use. Seal 108 prevents loss of grease.

Disassembly and repair of the cutter assembly E is quick and simple. Snap ring 102 is removed which permits removal of piston plug 100. Key element 96 includes a key slot 120 which has two slots 121, each having an undercut slot 123. The key tool of conventional construction is inserted into key slots 121 and turned into slots 123 to pull key element 96 from the central bore 64. Grooves 122 provided in the end of each pin 94 allow insertion of a tool to pull pins 90 inward into bores 68 which permits thrust bearing elements 56a, 56b and cutter element 50 to be pulled off pin 52 of arm D whereupon the thrust bearing elements may be examined and replaced as necessary.

In use, the cutter assembly operates in a normal fashion to cut a hole. However, when the cutter is rotating all movement between the cutter element 50 and thrust bearing 56 is on the exterior surface of thrust bearing elements 56a, 56b. As shown in FIG. 3, the normal rolling radius for the cutter is shown at 126. The outer surface of sides 80a, 80b of the thrust bearing elements take the radial load "b" placed on the cutter assembly during cutting of the hole. The reverse thrust load "c", however, is taken by the surface 128 of lobes 78a, 78b. The normal thrust load "a" is taken by the bottom surface of elements 76a, 76b. Further, as the bottom surface of elements 56a and 56b slightly wears, the lower surface of lobes 78a, 78b will provide a much larger surface including the bottom surface of lobes 78a and 78b to take this load than is normal in the conventional cutting assembly. By providing a means to absorb the reverse thrust load, the present invention provides a cutter and mounting assembly that is capable of a longer life than the conventional assemblies. The longer life of this cutter assembly further provides for excellent lubrication of all bearing surfaces. Additionally, since no rotation occurs around pin 52, no wear occurs on pin 52 and the underreamer arm need not be cut to have a new pin attached.

Figure 13:
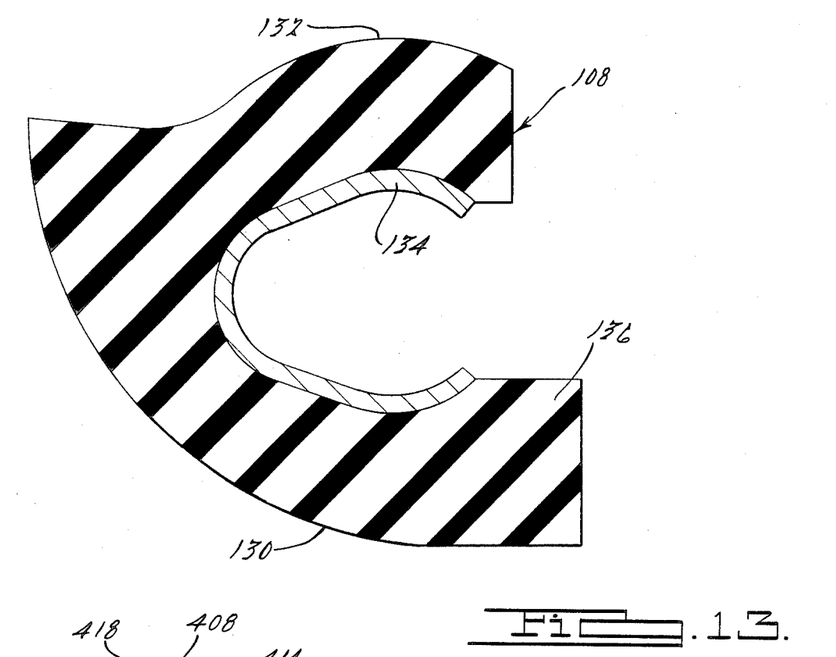
FIG. 13 is an enlarged cross-sectional view of the seal member utilized in the embodiment of FIG. 3.

The seal 108, as shown in cross-section in FIG. 13, provides sealing engagement between the cutter 50 and the pin 52 while minimizing wear on the pin 52. Unlike known sealing arrangements which cause wear on the pin 52 as the seal rotates with the cutter 50, the seal 108 remains stationary relative to the pin 52 thereby causing only the outer periphery of the seal 108 to become worn due to rotation of the cutter 50. The seal 108 has a substantially C-shaped cross-sectional configuration with an inner surface 130 of greater length than the outer surface 132. In addition, the length of the surface 130 and the overall length of the seal 108 is larger than the cavity 509 within which the seal 108 is disposed. Thus, the seal 108 is compressed within the cavity 509 in such a manner that the inner surface 130 of the seal 108 adheres to the pin 52 and, therefore, is stationary therewith. On the other hand, the cutter cone 50 rotates about the outer surface 132 of the seal 108.

As shown in FIG. 13, the seal 108 comprises a spring element 134 and a sealing element 136. The spring element 134 supports the sealing element 136 and forms the general configuration of the seal 108. In addition, this spring element 134 ensures that both the inner surface 130 and the outer surface 132 are biased towards their respective cooperating surface in order to provide a thorough seal therebetween. However, the spring element 134 provides sufficient resiliency to accomodate various compressions due to irregular thrust forces on the cutter core. Finally, to provide a sufficient fluid seal, the sealing element 136 is made of a rubber material which reduces wear on the cooperating surfaces while buffering the spring element 134 against contact with either the cutter cone 50 or the pin 52.

Figure 8:
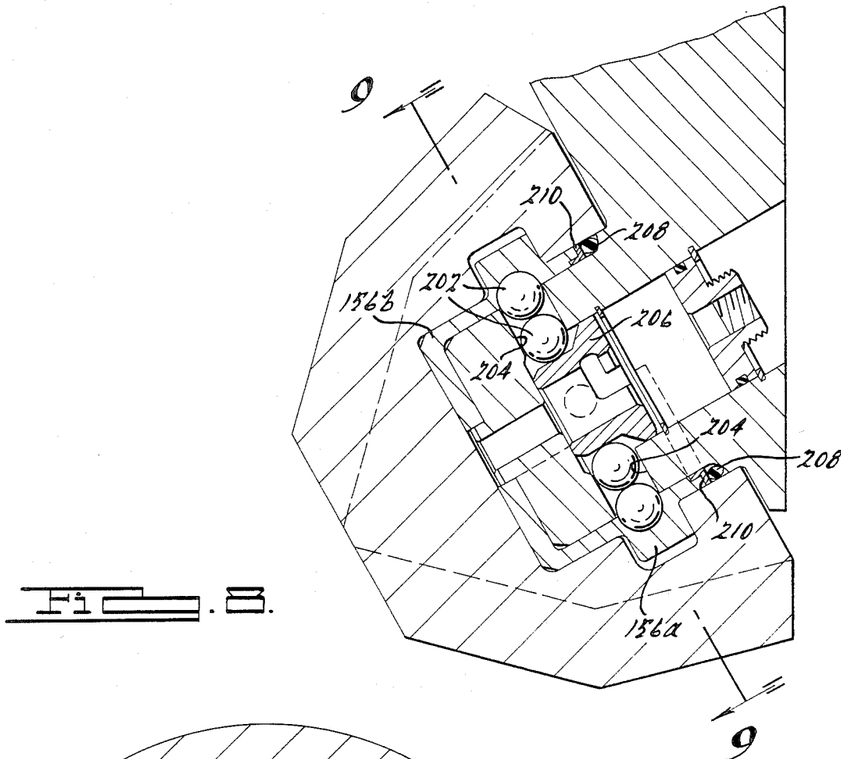
FIG. 8 is a second embodiment of the present invention, similar to FIG. 3.
Figure 9:
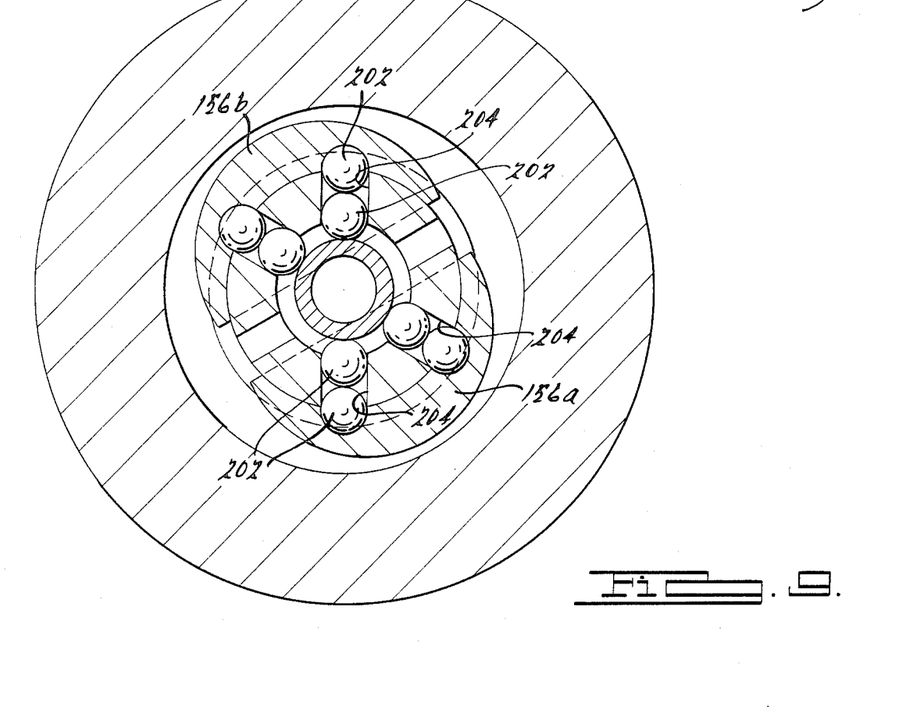
FIG. 9 is a cross-sectional view of this embodiment, similar to FIG. 4.

A second embodiment of the present invention is shown in FIGS. 8 and 9. In this embodiment, ball bearings 202 are used in place of pins 90. Thrust bearing elements 156a and 156b are constructed as described with respect to elements 56a and 56b. Ball bearings 202 are inserted with bores 204 and manually forced into place and held by key element 206. "O" ring seal 208 and a metal ring 210 are provided on the upper end of thrust bearing side surfaces 80a and 80b to provide a seal. Ring seal 208 and ring 210 are circular and cover the spacing between the split thrust bearing elements 156a and 156b.

Figures 10, 11:
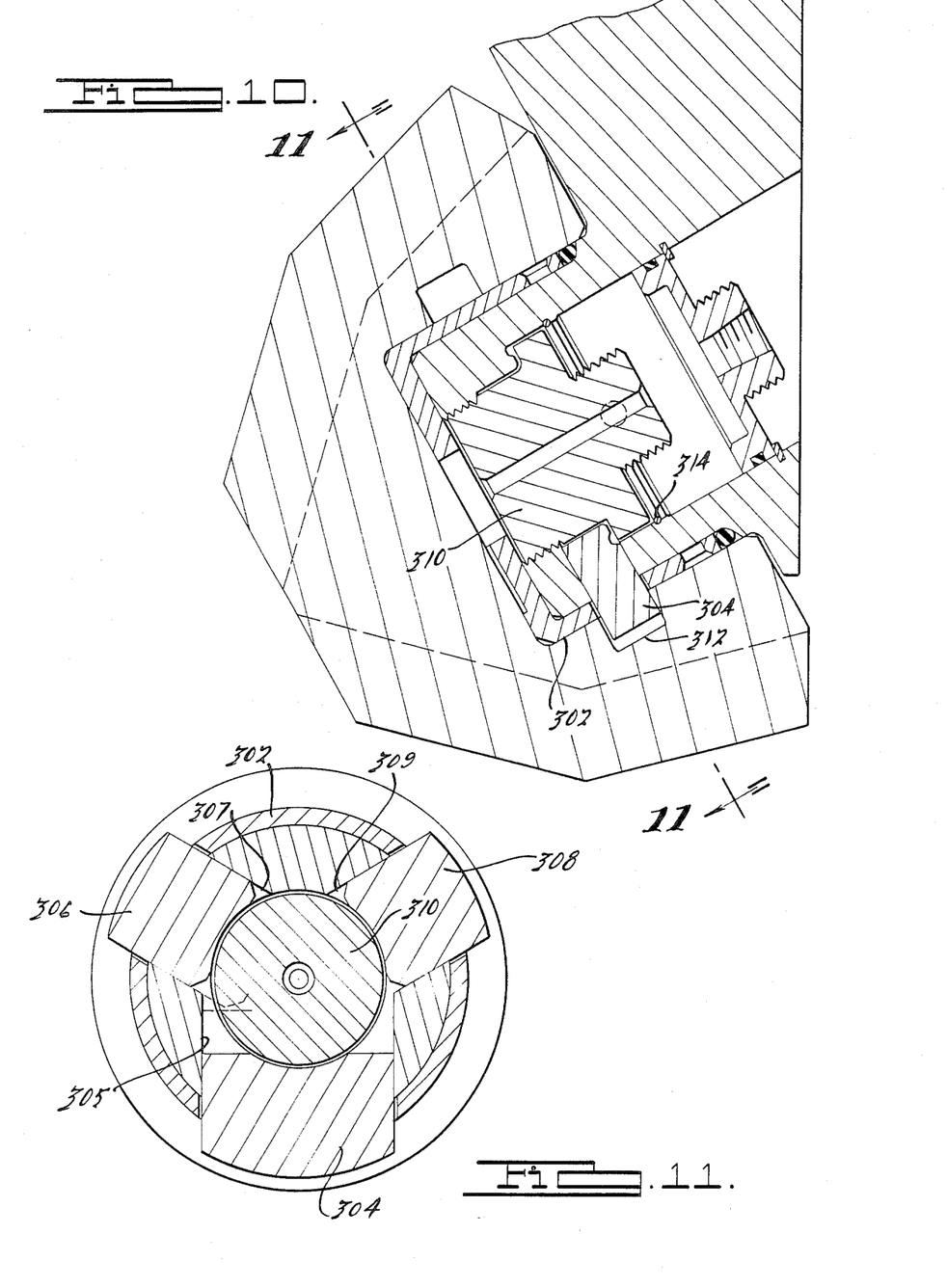
FIGS. 10 and 11 are, respectively, sectional and cross-sectional views of a third embodiment of this invention, similar to FIGS. 3 and 4.

In the embodiment of FIGS. 10 and 11, the lobes on the thrust bearing are provided by segmented thrust bearings. As shown, three thrust bearings 304, 306, 308 extend, respectively, through openings 305, 307 and 309 in cup-shaped thrust bearing 302 into groove 312 cut into the inner surface of bearing 302. As shown, thrust bearing 302 is a solid bearing; however, if a split bearing is desired, it may be used with four segmented bearings. In assembly, key element 310 holds the thrust bearings 304, 306, 308 outwardly in grooves 312 in the manner described for key element 96 in FIG. 3. Snap ring 314 holds element 310 in place.

Figure 12:
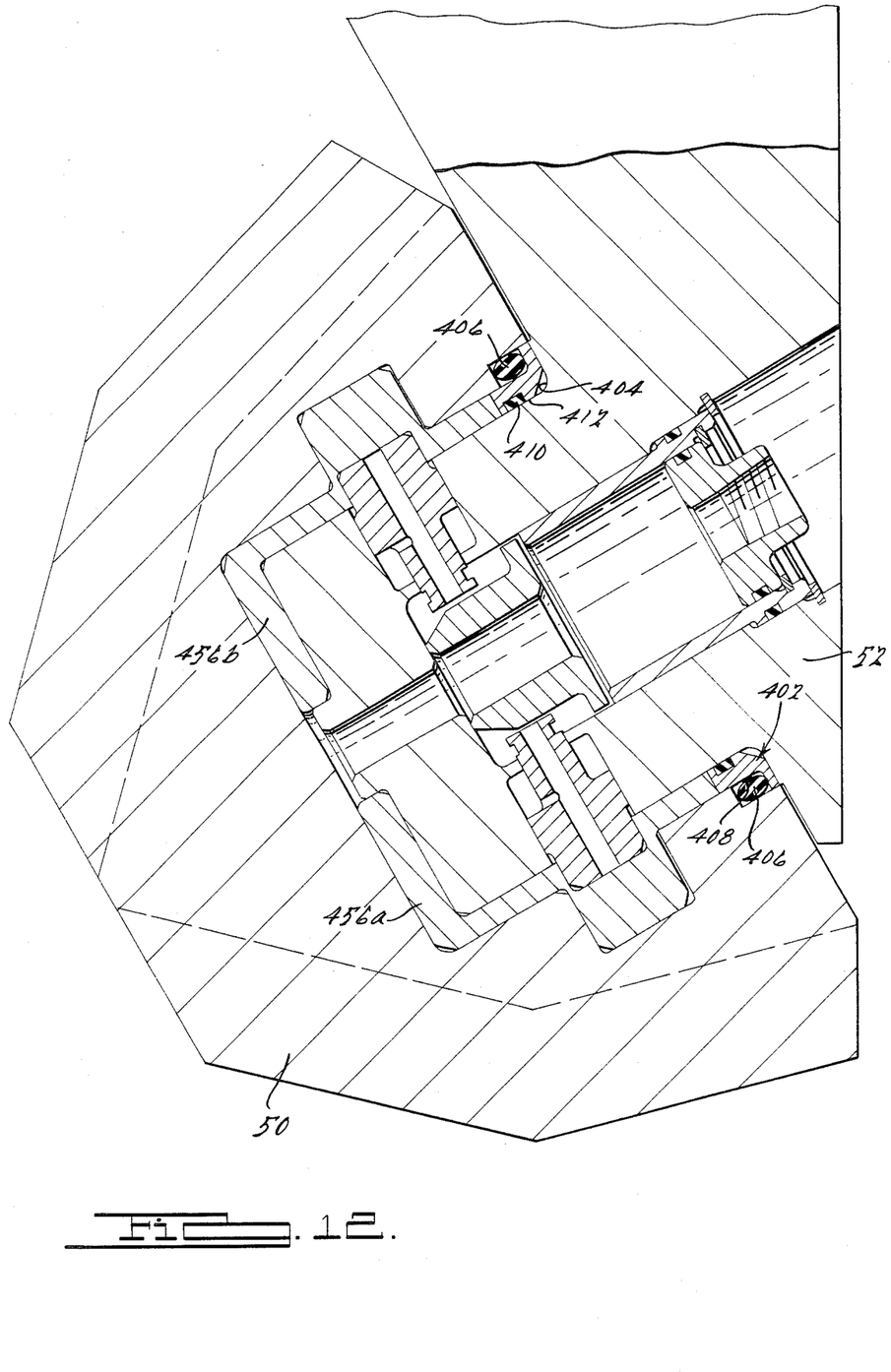
FIG. 12 is a cross-sectional view of a still further embodiment of the present invention.

A still further embodiment of the present invention is shown in FIG. 12. This embodiment employs a seal ring 402 which is disposed within the cavity 404 between the cutter 50 and the pin 52. This seal ring 402 is located above the thrust bearing elements 456a and 456b. In order to reduce uneven wear on the O-ring seal 406, the seal ring 402 acts as a thrust bearing which remains stationary with the pin 52. The O-ring seal 406 rotates along with the cutter cone 50 which causes wear on the outer peripheral surface 408 of the seal ring 402. However, because of the minimum cost in manufacturing the seal ring 402, it can be replaced at minimum cost. Moreover, because wear due to the reverse thrust c is transmitted over the entire circumference of the O-ring 406, these seals have a greater useful life. An inner seal 410 is provided on the inner surface 412 of the seal ring 402 to provide sealing engagement between the seal ring 402 and the pin 52.

Figure 14:
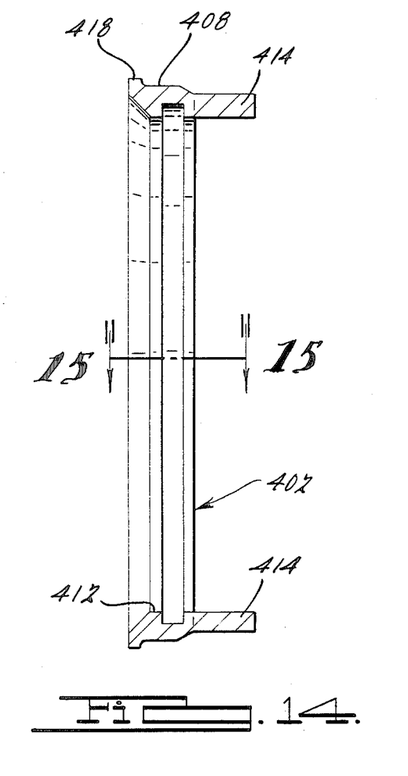
FIG. 14 is a cross-sectional view of the seal ring utilized in the embodiment of FIG. 12.
Figure 15:
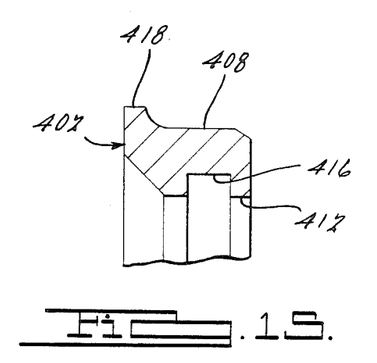
FIG. 15 is a partial cross-sectional view of the seal ring taken along line 15—15 of FIG. 14.

Referring now to FIGS. 14 and 15, the seal ring 402 has a substantially circular configuration and includes keying tabs 414 which extend between the thrust bearing elements 456a and 456b to maintain the special relationship of the thrust bearing elements. In addition, the tabs 414 prevent the seal ring 402 from rotating within the cavity 404. The seal ring 402 also includes a groove 416 within which the seal 410 is maintained. Finally, the seal ring 402 includes a peripheral flange 418 which provides proper spacing for the O-ring seal 406.

While there are described above the principles of this invention in connection with specific apparatus, it is to be clearly understood that this desciption is made only by way of example and not as a limitation to the scope of the invention.

We claim:
1. A drilling apparatus comprising:
 a body having a bore therethrough and a longitudinal slot in its wall;
 an arm mounted at its upper end to said body;
 a conical cutter having formation cutting means around its outer periphery, a central bore extending part way therethrough having an end wall and an annular side wall and groove means in said annular side wall;
 assembly means extending through said arm and into said bore for securing said cutter rotationally on said arm including pin means on said arm; and
 thrust bearing means surrounding said pin means and engaging said central bore, said assembly means comprising lobe means forming a part of said thrust bearing means extending into said groove means upon assembly of the apparatus, means for preventing rotation between said thrust bearing means and said pin means, and means for keeping said lobe means in said groove means;

said means for preventing rotation including at least one pin element, said pin means having a central bore, side bore means in the side of said pin means extending from the outside of the pin means into said central bore of the pin means, said pin element being adapted to slide within said side bore means and in a first position to have at least a portion thereof slide into said central bore of said pin means and in a second position to position said lobe means in said groove means, and means in said central bore of said pin means for retaining said pin element in said second position.

2. An apparatus according to claim 1 wherein said thrust bearing means is a split thrust bearing that includes two elements which when placed together form a cup-shaped bearing surrounding said pin means and each such element has a lobe thereon adapted to fit within said groove means.

3. An apparatus according to claim 1 wherein said pin element comprises a pin having a head and a shank, said side bore means including a larger section in which said head slides and a smaller section in which said shank slides connecting said larger section with said central bore of the pin means, at least a portion of said shank extending into the central bore of said pin means.

4. An apparatus as defined in claim 1 wherein said pin element comprises a plurality of ball bearings.

5. An apparatus as defined in claim 1 wherein said thrust bearing means has a slot therein and said pin element comprises a thrust bearing element, said thrust bearing element forming both the lobe of said thrust bearing means and said pin element.

6. A drilling apparatus comprising:
a body having a bore therethrough and a longitudinal slot in its wall;
an arm mounted at its upper end to said body;
a conical cutter having formation cutting means around its outer periphery, a central bore extending part way therethrough having an end wall and an annular side wall and groove means in said annular side wall;
assembly means extending through said arm and into said bore for securing said cutter rotationally on said arm including pin means on said arm; and
thrust bearing means surrounding said pin means and engaging said central bore, said assembly means comprising lobe means forming a part of said thrust bearing means extending into said groove means upon assembly of the apparatus, means for preventing rotation between said thrust bearing means and said pin means, and means for keeping said lobe means in said groove means;
said thrust bearing means comprising a split thrust bearing that includes two elements which when placed together form a cup-shaped bearing surrounding said pin means and each such element having a lobe thereon adapted to fit within said groove means.

7. An apparatus according to claim 6 wherein said means for preventing rotation includes at least one pin element, said pin means having a central bore, side bore means in the side of said pin means extending from the outside of the pin means into said central bore of the pin means, said pin element being adapted to slide within said side bore means and in a first position to have at least a portion thereof slide into said central bore of the pin means and in a second position to position said lobe in said groove means, and means in said central bore of the pin means for retaining said pin element in said second position.

8. An apparatus according to claim 6 and further comprising seal means disposed proximate said thrust bearing means, said seal means extending about said pin means and engaging said central bore.

9. An apparatus according to claim 8 wherein said seal means is a resilient seal member having a substantially C-shaped cross-sectional configuration, said seal member including an inner spring element and an outer sealing element.

10. An apparatus according to claim 9 wherein said seal member is configured to prevent rotation of said seal member with said conical cutter.

11. An apparatus according to claim 8 wherein said seal means is a seal ring having a pair of keying tabs, said keying tabs extending between said elements of said split thrust bearing to prevent rotation of said seal ring.

12. An apparatus according to claim 11 wherein said seal ring includes an O-ring seal which rotates with said conical cutter.

13. A drilling apparatus comprising:
a body having a bore therethrough and a longitudinal slot in its wall;
an arm mounted at its upper end to said body;
a conical cutter having formation cutting means around its outer periphery, a central bore extending part way therethrough having an end wall and an annular side wall and groove means in said annular side wall;
assembly means extending through said arm and into said bore for securing said cutter rotationally on said arm including pin means on said arm; and
thrust bearing means surrounding said pin means and engaging said central bore, said assembly means comprising lobe means forming a part of said thrust bearing means extending into said groove means upon assembly of the apparatus, means for preventing rotation between said thrust bearing means and said pin means, means for keeping said lobe means in said groove means;
said thrust bearing means being a split thrust bearing that includes two elements which when placed together from a cup-shaped bearing surrounding said pin means and each such element has a lobe thereon adapted to fit within said groove means in said cutter central bore;
said means for preventing rotation includes at least one pin element in each thrust bearing element, said pin means having a central bore, side bore means in each side of said pin means extending from the outside of the pin means into said central bore of the pin means, said thrust bearing elements each having bore means on the inside thereof mating with said side bore means, said pin element being adapted to slide within said side bore means and in a first position to have a portion thereof slide into said central bore of the pin means and in a second position to have a portion thereof extend into the bore means in the thrust bearing element to position said lobe in said groove means, and means in said central bore of the pin means for holding said pin element in said second position.

14. An apparatus as defined in claim 13 wherein said means for holding said pin elements comprises a key means slidable within the central bore of said pin means adapted to hold the pin elements in said second position upon insertion into the central bore and means for retaining said key means in said central bore of the pin means and further including plug means slidable within the central bore of said pin means whereby the plug means is exposed to well pressure during operation of the underreamer and means for retaining said plug means in said central bore, said plug means defining in the central bore of said pin means a grease chamber adapted to be filled with grease under pressure with said plug means being responsive to well pressure to keep pressure on said grease chamber.

15. An apparatus according to claim 14 wherein each said pin element comprises a pin having a head and a shank, each said side bore means including a larger section in which said head slides and a smaller section in which said shank slides connecting said larger section with said central bore of the pin means, at least a portion of said shank extending into the central bore of said pin means.

16. An apparatus according to claim 15 wherein said pin means includes a bottom element and the central bore thereof extends through said bottom element, said thrust bearing elements being separated by said bottom element, said key means including a bore therethrough whereby said grease chamber connects to said end wall of the central bore in the cutter.

* * * * *